US007736038B2

(12) United States Patent
Suzuki

(10) Patent No.: US 7,736,038 B2
(45) Date of Patent: Jun. 15, 2010

(54) VEHICLE HEADLIGHT

(75) Inventor: Eiji Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 62 days.

(21) Appl. No.: 12/109,086

(22) Filed: Apr. 24, 2008

(65) Prior Publication Data

US 2008/0266889 A1 Oct. 30, 2008

(30) Foreign Application Priority Data

Apr. 25, 2007 (JP) ............................ 2007-115546

(51) Int. Cl.
*B60Q 1/00* (2006.01)

(52) U.S. Cl. ....................... 362/539; 362/538; 362/507; 362/512; 362/227; 362/319

(58) Field of Classification Search ................. 362/539, 362/538, 507, 475, 512–514, 227, 319
See application file for complete search history.

(56) References Cited

U.S. PATENT DOCUMENTS 6,443,606 B1 * 9/2002 Mochizuki .................. 362/513
6,857,768 B2 * 2/2005 Watanabe et al. ........... 362/512
7,008,093 B2 3/2006 Fukawa et al.
2001/0015896 A1 8/2001 Tsukamoto
2003/0086277 A1 5/2003 Hayakawa et al.

FOREIGN PATENT DOCUMENTS

| | | | |
|---|---|---|---|
| EP | 0 794 382 | A2 | 9/1997 |
| FR | 2 754 500 | | 4/1998 |
| FR | 2 854 226 | | 10/2004 |
| JP | 2003-151319 | A | 5/2003 |
| JP | 2005-026147 | A | 1/2005 |
| JP | 2005-093182 | A | 4/2005 |

* cited by examiner

*Primary Examiner*—Jong-Suk (James) Lee
*Assistant Examiner*—Mark Tsidulko
(74) *Attorney, Agent, or Firm*—Foley & Lardner LLP

(57) ABSTRACT

The driving unit includes an attaching portion, a first contact surface, and a second contact surface. The frame includes a receiving portion to which the attaching portion is attached, a first contact receiving surface with which the first contact surface is in contact, and a second contact receiving surface with which the second contact surface is in contact.

4 Claims, 3 Drawing Sheets

VEHICLE HEADLIGHT

CROSS-REFERENCE TO RELATED APPLICATIONS

The present application claims priority to and incorporates by reference the entire contents of Japanese priority document 2007-115546 filed in Japan on Apr. 25, 2007.

BACKGROUND OF THE INVENTION

1. Field of the Invention

The present invention relates to a vehicle headlight, particularly a project type headlight for a vehicle, which includes a plurality of light distribution patterns such as a low-beam light pattern and a high-beam light pattern.

2. Description of the Related Art

In a conventional vehicle headlight such as one disclosed in Japanese Patent Application Laid-open No. 2005-93182 consists of a light source that emits light, a reflector that reflects the light emitted by the light source, a projection lens that projects the reflection light from the reflector forward of a vehicle, a shade for changing the reflection light toward the projection lens from the reflector into a plurality of light beams capable of making a plurality of light distribution patterns, a spring and a driving unit configured to move the shade to a plurality of positions corresponding to the light beams, and a frame.

When the light source of the conventional vehicle headlight is turned on, the light emitted by the light source is reflected toward the shade and the projection lens on the reflection surface of the reflector, and the reflected light is projected forward of the vehicle from the projection lens. With a spring action and a driving action by the spring and the driving unit, the position of the shade is changed to a plurality of positions, so that the reflected light toward the projection lens from the reflector is changed into a plurality of light beams, enabling to make a plurality of light distribution patterns. Therefore, in such vehicle headlight, the driving unit needs to be fixed with high positional accuracy to the frame to change the position of the shade smoothly.

SUMMARY OF THE INVENTION

It is an object of the present invention to at least partially solve the problems in the conventional technology.

According to an aspect of the present invention, a vehicle headlight capable of obtaining a plurality of light distribution patterns comprises, a light source that emits light, a reflector that reflects the light emitted by the light source, a projection lens that projects the light reflected by the reflector forward of a vehicle, a shade that forms the light traveling to the projection lens from the reflector into a plurality of light beams that form the light distribution patterns, a spring and a driving unit, configured to move the shade to a plurality of positions corresponding to the light beams, the driving unit including an attaching portion, and a first contact surface and a second contact surface that are substantially orthogonal to each other, a frame that includes a receiving portion to which the attaching portion is attached, a first contact receiving surface for positioning the driving unit in a first positioning direction that intersects with an attaching direction in which the driving unit is attached to the frame by being in contact with the first contact surface, and a second contact receiving surface for positioning the driving unit in a second positioning direction that intersects with the attaching direction and is substantially orthogonal to the first positioning direction being in contact with the second contact surface, and an attaching member for attaching the attaching portion to the receiving portion in a direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
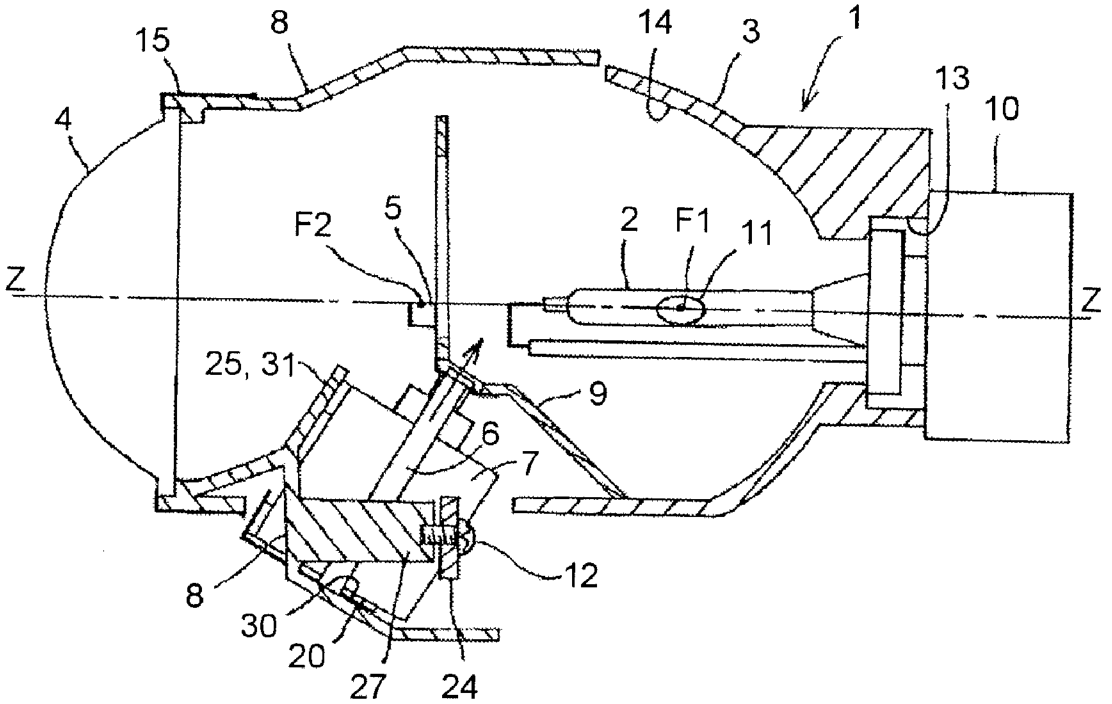
FIG. 1 is a cross section of a vehicle headlight in an embodiment according to the present invention in which a shade is in a low beam position.

Exemplary embodiments of the present invention are explained in detail below with reference to the accompanying drawings. In the drawings, a symbol "VU-VD" indicates an up-and-down vertical line on a screen, and a symbol "HL-HR" indicates a right-to-left horizontal line on the screen. In the specification, the terms "upper, lower, front, rear, left, and right" mean "upper, lower, front, rear, left, and right" of a vehicle (automobile) when a vehicle headlight 1 is mounted thereon.

Figure 2:
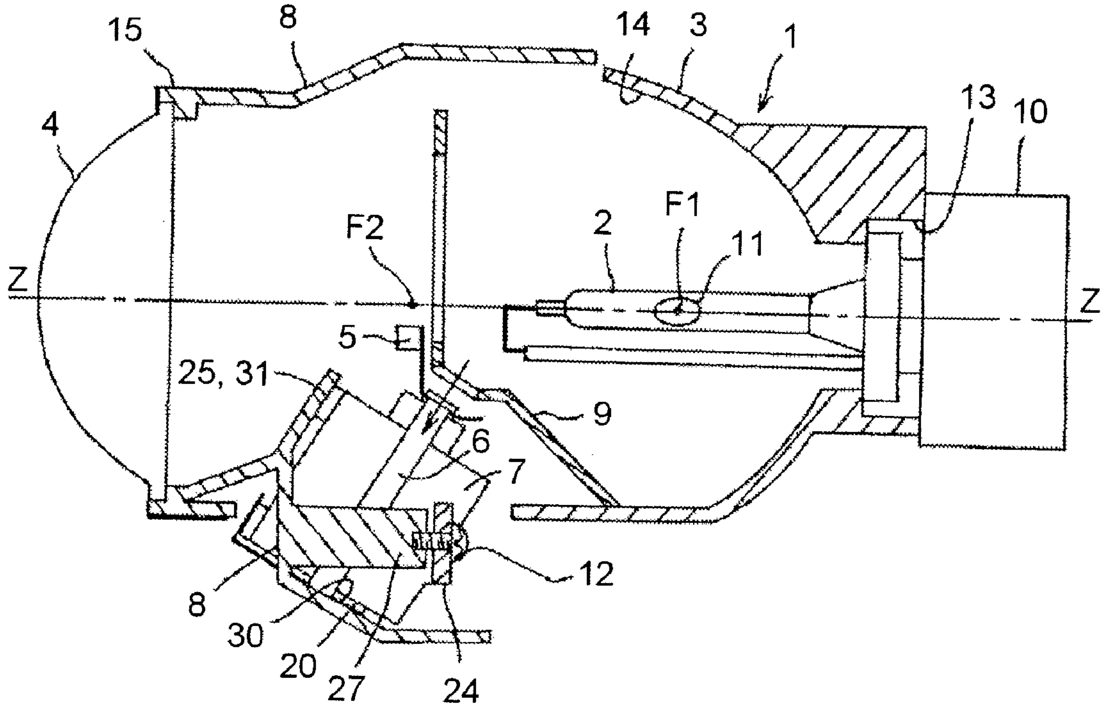
FIG. 2 is a cross section of the vehicle headlight in which the shade is in a high beam position.

The vehicle headlight 1 according to an embodiment is explained. In FIGS. 1 and 2, the vehicle headlight 1 is, for example, a projector-type headlamp, and is mounted on each of the right side and the left side on a front portion of the vehicle. The vehicle headlight 1 includes a light source 2, a shade 5, a reflector 3, a projection lens 4 (a condensing lens, a convex lens), a spring 6, a driving unit 7, a frame 8, a stopper 9, screws 12 as attaching members, a lamp housing (not shown), and a lamp lens (e.g., a transparent outer lens).

The lamp unit includes the light source 2, the reflector 3, the projection lens 4, the shade 5, the spring 6, the driving unit 7, the frame 8, the stopper 9, and the screws 12. The lamp unit is arranged in a lamp room formed by the lamp housing and the lamp lens via, for example, an optical axis adjusting mechanism (not shown).

In the present embodiment, the light source 2 is a discharge lamp such as a high-pressure metal vapor discharge lamp or a high-intensity discharge lamp (HID) such as a metal halide lamp. The light source 2 is detachably attached to the reflector 3 via a socket mechanism 10, and includes a light emitting element 11. Instead of the discharge lamp, the light source 2 can be halogen lamp or an incandescent lamp.

The reflector 3 reflects the light emitted by the light source 2 to the projection lens 4. In the present embodiment, the reflector 3 is made of material with high thermal conductivity and thermal emissivity. For example, the reflector 3 is made of synthetic resin or formed by aluminum die casting. The reflector 3 is fixed to the frame 8 with an attaching member, a fixing member, or the like (not shown). The reflector 3 has a hollow concave shape with a front side (a side from which the light from the vehicle headlight 1 is radiated) opened and a rear side closed. A round through hole 13 is formed in the rear side portion of the reflector 3, into which the light source 2 is inserted.

An aluminum deposition, a silver painting, or the like is performed on the concave inner surface of the reflector 3 to form a reflection surface 14. The reflection surface 14 is an elliptical reflection surface or a reflection surface based on an ellipse, including a reflection surface having an ellipsoid of revolution or a free curved surface (a NURBS curved surface) based on an ellipse, that is, the reflection surface in which a vertical cross section shown in FIGS. 1 and 2 forms an ellipse and a horizontal cross section (not shown) forms a parabolic or a deformed parabolic surface. The reflection surface 14 of the reflector 3 includes a first focal point F1, a second focal point F2 (a focal line on a horizontal cross section), and a vertical optical axis Z-Z. The vertical optical axis Z-Z and an optical axis (not shown) of the light source 2 coincide or substantially coincide with each other.

The NURBS curved surface of the reflection surface 14 is a free curved surface of the NURBS (a non-uniform rational B-spline surface) described in "Mathematical Elements for Computer Graphics" (Devid F. Rogers, J Alan Adams). The first focal point F1 is located at or near the light emitting element 11, and the second focal point F2 is located at or near the shade 5. In the present embodiment, the second focal point F2 is located between a first shade 16 and a second shade 17.

The projection lens 4 is a convex aspherical lens, and projects the reflection light from the reflection surface 14 forward of the vehicle. The front portion of the projection lens 4 forms a convex aspherical surface, and the rear portion of the projection lens 4 forms a planar aspherical surface (a planar surface). The projection lens 4 is fixed to the front side of the frame 8 with a rim 15 that is an annular fixing member. The projection lens 4 includes a lens focal point (a meridional image surface that is a focal plane on an object space side) (not shown), and an optical axis (not shown). The focal point of the projection lens 4 and the second focal point F2 coincide or substantially coincide with each other. The optical axis of the projection lens 4 and the optical axis Z-Z coincide or substantially coincide with each other. The optical axis of the projection lens 4 and the optical axis Z-Z can be horizontally misaligned with each other.

Figure 6:
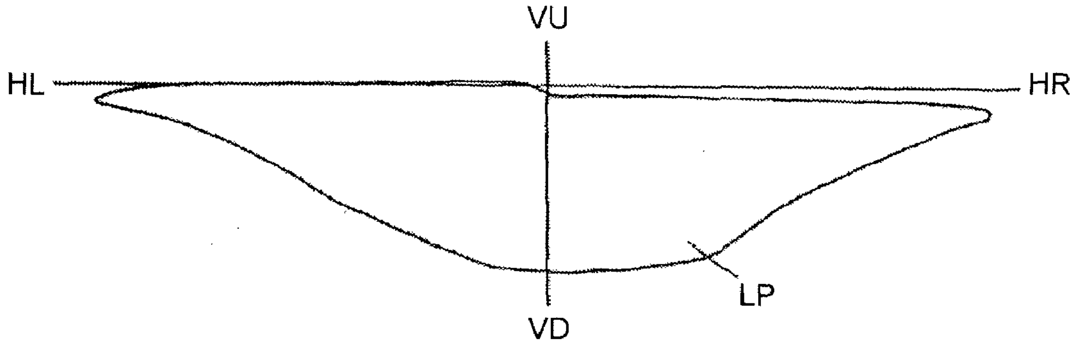
FIG. 6 is a schematic diagram for explaining a light distribution pattern for passing.
Figure 7:
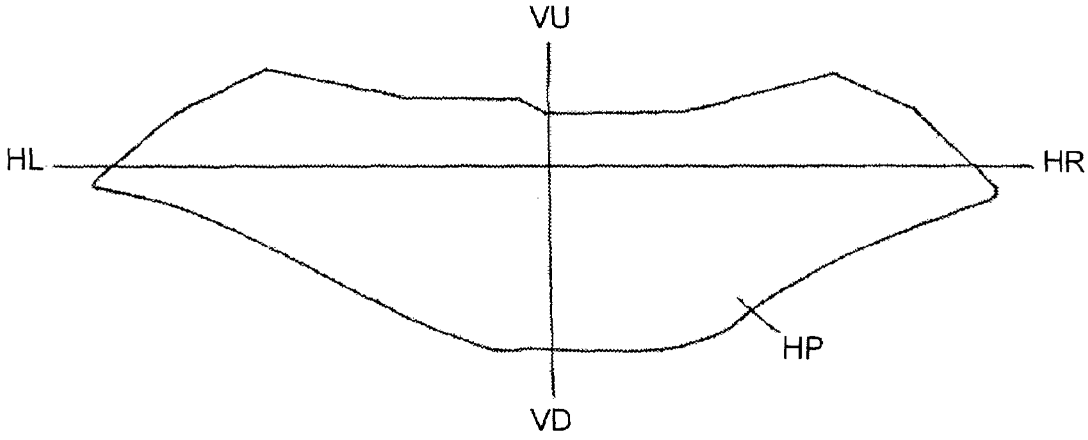
FIG. 7 is a schematic diagram for explaining a light distribution pattern for driving.

The shade 5 changes the reflection light from the reflection surface 14 to the projection lens 4 into a plurality of light beams capable of making a plurality of light distribution patterns. The light distribution patterns include a light distribution pattern for passing LP as shown in FIG. 6 and a light distribution pattern for driving HP as shown in FIG. 7. The light beams includes a low beam (not shown) for obtaining the light distribution pattern for passing LP and a high beam (not shown) for obtaining the light distribution pattern for driving HP. The shade 5 has a plate structure that is low in manufacturing cost (a flat thin steel plate structure in the present embodiment).

As shown in FIGS. 1 to 5, the shade 5 includes the vertical first shade 16 on the rear side (a side of the light source 2), the vertical second shade 17 on the front side (a side of the projection lens 4), a diagonal attaching portion 18, and a horizontal stopper portion 19. The first shade 16 and the second shade 17 switches the reflection light between the low beam and the high beam. The upper edges of the first shade 16 and the second shade 17 substantially coincide with each other in a horizontal direction, and form a cutoff line defining the upper edge of the light distribution pattern for passing LP. The lower edge of the first shade 16 is lower than the lower edge of the second shade 17. The diagonal attaching portion 18 and the stopper portion 19 are provided to the lower edge of the first shade 16. The right and left ends of the first shade 16 and the second shade 17 are attached together.

The spring 6 and the driving unit 7 are configured to move the shade 5 to a plurality of positions capable of obtaining the low and high beams (a low beam position and a high beam position). The shade 5 at the low beam position is shown in FIG. 1, in which the shade 5 is moved diagonally upward and backward with respect to a vertical direction, and the shade 5 at the high beam position is shown in FIG. 2, in which the shade 5 is moved diagonally downward and forward with respect to the vertical direction.

Figure 5:
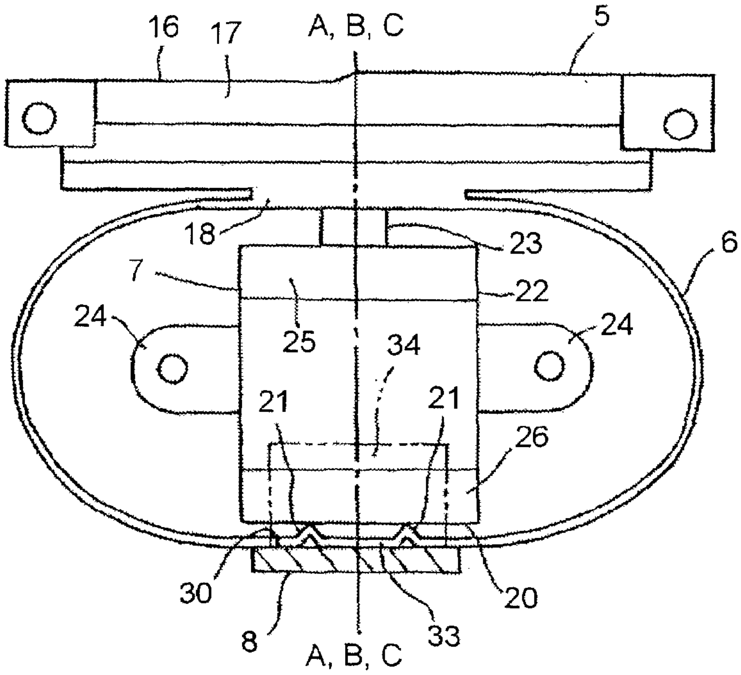
FIG. 5 is a front view of the vehicle headlight illustrating part of the solenoid, the spring, and the shade.

The spring 6 has a thin plate structure having elasticity such as a stainless used steel (SUS) (a spring steel plate). As shown in FIG. 5, the spring 6 is formed by connecting semicircular portions that are right and left end portions opposing each other via upper and lower middle horizontal portions. The shade 5 and the spring 6 have an integral structure. Specifically, the diagonal attaching portion 18 of the shade 5 and the upper middle horizontal portion of the spring 6 are fixed to each other or formed to be integrated with each other. In this manner, the shade 5 and the spring 6 can be manufactured separately and integrated, or can be manufactured integrally.

The driving unit 7 is a solenoid including a rectangular solid shaped body 22 and a rod (plunger) 23 that moves forward and backward with respect to the body 22 as shown in FIGS. 1 to 5. A yoke (not shown) made of material with high thermal conductivity such as metal and a coil (not shown) are stored in the body 22.

The frame 8 is made of material with high thermal conductivity and thermal emissivity. For example, the frame 8 is made of synthetic resin or formed by aluminum die casting. The driving unit 7 is attached to the frame 8 with the screws 12 from backward to forward in an attaching direction D (a direction parallel to the optical axis Z-Z, or the horizontal direction). In addition to the driving unit 7, the spring 6 that is integral with the shade 5 and the stopper 9 are also fixed to the frame 8.

The stopper 9 is made of material with high thermal conductivity such as a metal plate. The stopper 9 regulates the movement of the shade 5 when the shade 5 is moved to the low beam position. Specifically, as shown in FIG. 1, when the driving unit 7 is not driven (the driving unit 7 is not energized), the first shade 16 and the stopper portion 19 are elastically in contact with the stopper 9 by a spring force of the spring 6, so that the shade 5 is positioned to the low beam position.

The driving unit 7 includes attaching portions 24, a first contact surface 20, a second contact surface 25, and a contact portion 26. The attaching portions 24 are provided integrally to the right and left sides of the yoke. Through holes 28 are formed in the attaching portions 24 for screwing the screws 12 in the attaching direction D.

The first contact surface 20 is provided on a bottom surface of the body 22 that is opposite to a surface (a flat top surface) on which the rod 23 is arranged. The second contact surface 25 is provided on a front surface of a convex portion provided on the upper side of a front surface (a surface opposing the projection lens 4) of the body 22 out of four side surfaces. The first contact surface 20 and the second contact surface 25 are provided in directions E and F that intersects with the attaching direction D and are mutually orthogonal or substantially orthogonal, respectively. Specifically, the first contact surface 20 is provided in the direction F (a diagonal direction from the rear lower side to the front upper side), and the second contact surface 25 is provided in the direction E (a diagonal direction from the rear upper side to the front lower side).

The contact portion 26 is provided in a convex manner on the lower side of the front surface of the body 22 out of the four side surfaces.

The frame 8 includes receiving portions 27, a first contact receiving surface 30, and a second contact receiving surface 31. The receiving portions 27 are provided to correspond to the attaching portions 24. Screw holes 32 are formed in the receiving portions 27 to correspond to the through holes 28 for screwing the screws 12 in the attaching direction D.

The first contact receiving surface 30 is provided to correspond to the first contact surface 20, and the second contact receiving surface 31 is provided to correspond to the second contact surface 25. The first contact receiving surface 30 and the second contact receiving surface 31 are provided in the directions E and F, each of which intersect with the attaching direction D of the screw 12 and crosses at right angles (or at nearly right angles) each other, respectively.

Figure 4:
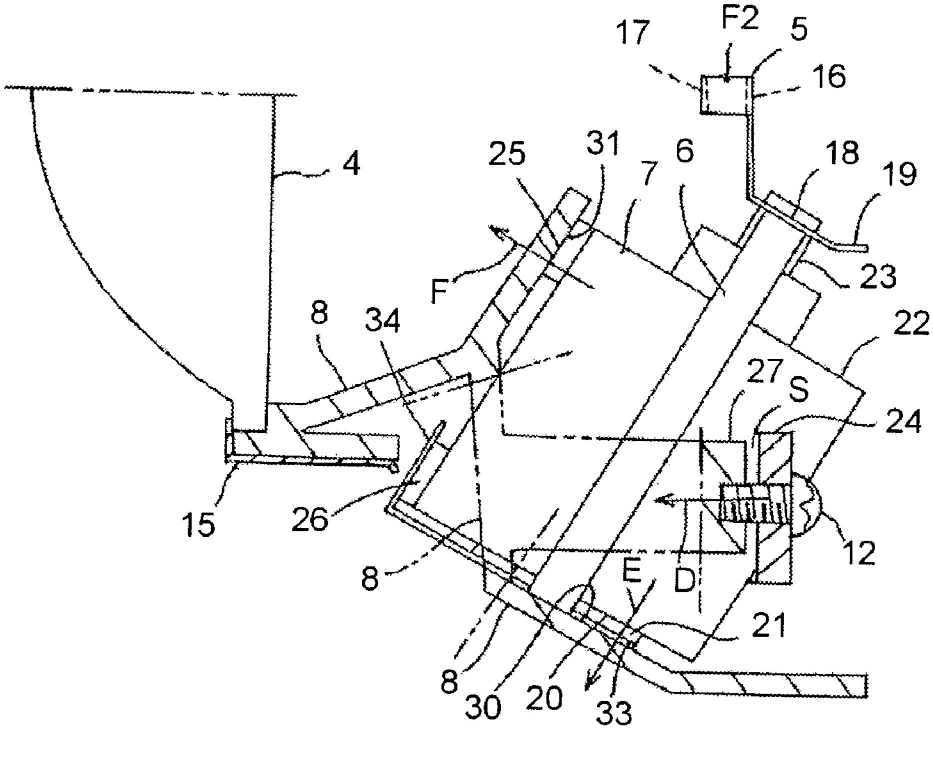
FIG. 4 is a cross section of a relevant part of the vehicle headlight after the solenoid, the spring, and the shade are fixed to the frame.

As shown in FIGS. 1, 2, and 4, in a state where the driving unit 7 is fixed to the frame 8 with the screws 12, the first contact surface 20 and the second contact surface 25 are in contact with the first contact receiving surface 30 and the second contact receiving surface 31; however, there is a clearance S between the attaching portions 24 and the receiving portions 27.

The spring 6 is provided with a fixing part 33 and a positioning part 34. The fixing part 33 is provided to the lower middle horizontal portion of the spring 6 (a portion that is on the opposite side of the upper middle horizontal portion that is integral with the diagonal attaching portion 18) to be inclined in a direction from the front upper side to the rear lower side so that the fixing part 33 is parallel or substantially parallel to the diagonal attaching portion 18. The fixing part 33 includes triangular convex portions 21 that are inclined in a direction from the front upper side to the rear lower side to be parallel to the diagonal attaching portion 18. The convex portions 21 can be provided on the bottom surface side of the body 22 or to both of the spring 6 and the body 22.

The positioning part 34 is connected to the front edge of the fixing part 33 to be integral with the fixing part 33. The positioning part 34 extends in a direction from the rear upper side to the front lower side to be orthogonal or substantially orthogonal to the fixing part 33.

The driving unit 7 is stored in a space formed by connecting the semicircular parts of the spring 6 via the upper and lower middle horizontal portions. The diagonal attaching portion 18 that is integral with the shade 5 is temporarily fixed to the front edge of the rod 23 with a temporarily fixing unit (not shown). The fixing part 33 and the convex portions 21 are positioned to oppose the first contact surface 20, and the positioning part 34 is positioned to oppose the contact portion 26.

Figure 3:
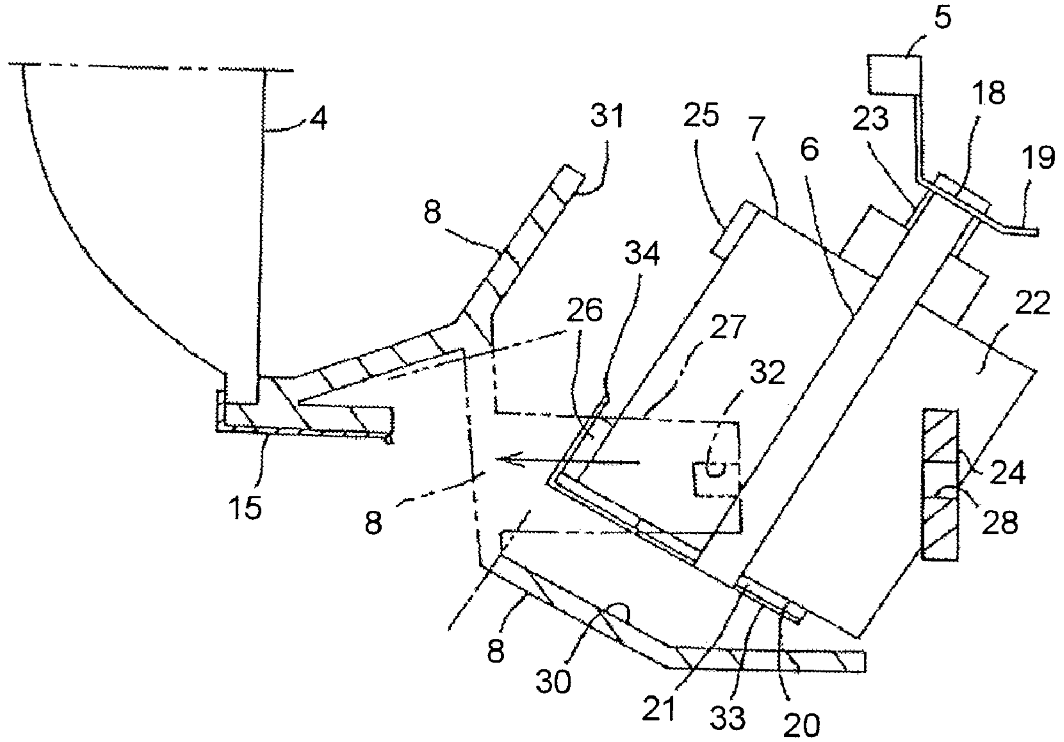
FIG. 3 is a cross section of a relevant part of the vehicle headlight before a solenoid, a spring, and a shade are fixed to a frame.

The driving unit 7, the spring 6, and the shade 5 are set to the frame 8 in a direction indicated by an arrow of a solid line in FIG. 3, i.e., from backward to forward in the attaching direction D. The first contact surface 20 opposes the first contact receiving surface 30 via the fixing part 33 and the convex portions 21, and the second contact surface 25 opposes the second contact receiving surface 31.

The attaching portions 24 are attached to the receiving portions 27 with the screws 12 from backward to forward in the attaching direction D. Thus, the driving unit 7, and the spring 6 and the shade 5 that are integrated are fixed to the frame 8.

At this time, as shown in FIGS. 1, 2, and 4, the driving unit 7 is arranged so that the body 22 is positioned diagonally forward and downward of the rod 23 and the shade 5 on the opposite side of the light source 2. In other words, the driving unit 7 is arranged to be inclined from the front lower side to the rear upper side.

The first contact surface 20 is in contact with the first contact receiving surface 30 in the direction E via the fixing part 33 and the convex portions 21. The direction E coincides or substantially coincides with a shade position changing direction B-B between the low beam position at which the shade 5 is positioned diagonally upward and backward and the high beam position at which the shade 5 is positioned diagonally downward and forward.

The second contact surface 25 is in contact with the second contact receiving surface 31 in the direction F. The direction F is orthogonal or substantially orthogonal to the shade position changing direction B-B.

The fixing part 33 is fixed while being sandwiched between the first contact surface 20 and the first contact receiving surface 30 in the direction E in which the driving unit 7 is positioned by the first contact surface 20 and the first contact receiving surface 30, and the positioning part 34 is in contact with the contact portion 26 to be positioned in the direction F in which the driving unit 7 is positioned by the second contact surface 25 and the second contact receiving surface 31.

A spring force acting direction A-A by the spring 6, the shade position changing direction B-B, and a rod moving direction C-C in which the rod 23 moves forward and backward are coincide or substantially coincide with each other, and are inclined about 30 degrees with respect to the vertical axis, or about 60 degrees with respect to the optical axis Z-Z or the horizontal axis.

The operation by the vehicle headlight 1 configured as above is explained.

Upon turning on the light source 2, the light is radiated from the light emitting element 11, which is reflected by the reflection surface 14 to the shade 5 and the projection lens 4. At this time, when the driving unit 7 is not driven i.e., the driving unit 7 is not energized, the rod 23 moves forward by the spring force of the spring 6, and the shade 5 is biased in a direction indicated by an arrow of a solid line in FIG. 1. In this state, the shade 5 is elastically in contact with the stopper 9, so that the shade 5 is controlled to the low beam position. Therefore, the shade 5 is in the low beam position shown in FIG. 1.

When the shade 5 is in the low beam position, part of the reflection light from the reflection surface 14 is shielded by the first shade 16 and the second shade 17, and a remaining part of the light travels toward the projection lens 4 and is projected (radiated) forward of the vehicle in the light distribution pattern for passing LP via the projection lens 4 as shown in FIG. 6.

Upon energizing the driving unit 7, the driving unit 7 is driven and the rod 23 moves backward against the spring force by the spring 6. Therefore, the right and left portions of the spring 6 each having semicircular shape are elastically deformed to have an elliptical shape, i.e., a shape formed by vertically pressing the spring 6. With this deformation of the spring 6, the shade 5 is moved in a direction as indicated by an arrow of a solid line in FIG. 2, that is, the shade 5 is moved from the low beam position as shown in FIG. 1 to the high beam position as shown in FIG. 2.

When the shade 5 is moved to the high beam position, the part of the light that has been shielded by the first shade 16 and the second shade 17 travels toward the projection lens 4 together with the light that has not been shielded, and is projected (radiated) forward of the vehicle in the light distribution pattern for driving HP via the projection lens 4 as shown in FIG. 7.

When energization to the driving unit 7 is stopped so that the driving unit 7 is in a not-driven state, each of the right and left portions of the spring 6 that has been elastically deformed into the semi-elliptical shape elastically recovers its initial shape that is the semicircular shape by its own spring force. Therefore, the shade 5 is moved from the high beam position to the low beam position. Consequently, the light distribution pattern is changed from the light distribution pattern for driving HP to the light distribution pattern for passing LP.

In the vehicle headlight 1 according to the present embodiment, when the attaching portions 24 of the driving unit 7 are attached to the receiving portions 27 of the frame 8 with the screws 12, the first contact surface 20 and the second contact surface 25 are in contact with the first contact receiving surface 30 and the second contact receiving surface 31, and the driving unit 7 is positioned to the frame 8 in the directions E and F to be fixed with high accuracy.

Furthermore, in the vehicle headlight 1 according to the present embodiment, simply by providing the first contact surface 20 and the second contact surface 25 to the driving unit 7, and providing the first contact receiving surface 30 and the second contact receiving surface 31 to the frame 8, i.e., without adding a new component, the driving unit 7 can be positioned to the frame 8 with high accuracy. Therefore, the manufacturing cost is not increased.

Moreover, in the vehicle headlight 1 according to the present embodiment, when the driving unit 7 and the frame 8 are connected by attaching the attaching portions 24 to the receiving portions 27, the first contact surface 20 and the second contact surface 25 are in contact with the first contact receiving surface 30 and the second contact receiving surface 31. Therefore, the area in which the driving unit 7 is in contact with the frame 8 can be increased. Consequently, in the vehicle headlight 1, the heat generated in the driving unit 7 can be efficiently transferred to the frame 8 to be dissipated outside.

Furthermore, in the vehicle headlight 1 according to the present embodiment, the driving unit 7 is positioned to the frame 8 in the directions E and F to be fixed thereto with high accuracy. Therefore, even if processing accuracy of the attaching portions 24 and the receiving portions 27 is low so that the attaching position of the attaching portions 24 to the receiving portions 27 is misaligned, the driving unit 7 can be appropriately positioned to the frame 8 in the E and F directions by using the surface-pairs of the first contact surface 20 and the first contact receiving surface 30, and the second contact surface 25 and the second contact receiving surface 31 as guides, enabling to fix the driving unit 7 to the frame 8 with high accuracy. The vehicle headlight 1 according to the present embodiment is suitable for fixing the driving unit 7, which is relatively difficult to attach the attaching portions 24 thereof to the receiving portions 27 of the frame 8 with high accuracy, in the shade position changing direction B-B, i.e., a direction diagonal to the vertical direction.

Moreover, in the vehicle headlight 1 according to the present embodiment, when the driving unit 7 is fixed to the frame 8 with the screws 12, the first contact surface 20 and the second contact surface 25 are in contact with the first contact receiving surface 30 and the second contact receiving surface 31 while keeping the clearance S between the attaching portions 24 and the receiving portions 27 as shown in FIGS. 1, 2, and 4. Therefore, the first contact surface 20 and the second contact surface 25 can be surely in contact with the first contact receiving surface 30 and the second contact receiving surface 31, so that the driving unit 7 can be positioned and fixed to the frame 8 more accurately.

Furthermore, in the vehicle headlight 1 according to the present embodiment, the fixing part 33 is fixed in the direction E while being sandwiched between the first contact surface 20 and the first contact receiving surface 30, and the positioning part 34 is in contact with the contact portion 26 to be positioned in the direction F. Therefore, the spring 6 can be positioned and fixed to the driving unit 7 and the frame 8 with high accuracy. Specifically, upon attaching the attaching portions 24 to the receiving portions 27 with the screws 12, the fixing part 33 is fixed in a state of being sandwiched between the first contact surface 20 and the first contact receiving surface 30, and the positioning part 34 is in contact with the contact portion 26 to be guided to the side of the driving unit 7.

Moreover, in the vehicle headlight 1 according to the present embodiment, the spring 6 and the shade 5 are integrated, so that the shade 5 together with the spring 6 can be positioned and fixed to the driving unit 7 and the frame 8 with high accuracy.

The vehicle headlight 1 according to a modification of the present embodiment is configured to obtain the light distribution pattern for driving HP and the light distribution pattern for passing LP as shown in FIGS. 6 and 7. However, the vehicle headlight 1 can be configured to obtain the light distribution pattern for passing and a light distribution pattern for highway, the light distribution pattern for passing, the light distribution pattern for highway, and the light distribution pattern for driving, or the light distribution pattern for passing and other one or more light distribution patterns. A plurality of the shades 5 can be provided, and a plurality of rods 23 can be provided.

In the present embodiment, a solenoid is used as the driving unit 7; however, other components such as a motor can be used as the driving unit. When the motor is used, a rotation force transmitting mechanism (such as a gear or a cam) for transmitting a rotation force of the motor to the rod is needed.

Furthermore, in the present embodiment, the spring force acting direction A-A, the shade position changing direction B-B, and the rod moving direction C-C are inclined with respect to the vertical axis or the horizontal axis; however, they can coincide with the vertical direction.

Moreover, in the present embodiment, the spring 6 is formed by connecting the semicircular portions that are the right and left end portions opposing each other via the upper and lower middle horizontal portions; however, a spring having other structures can be used. For example, a plate spring, or a coil spring can be used.

Furthermore, the screws 12, which are used as the attaching members in the present embodiment, can be replaced with a bolt and nut, pins for crimping, fitting, or compressing, or the like.

Moreover, in the present embodiment, the driving unit 7 is fixed to the frame 8 with the screws 12; however, the driving unit 7 and the reflector 3 can be fixed to the frame 8 by integrally attaching them to the frame 8 with the attaching member.

Furthermore, in the present embodiment, the first contact surface 20 is in contact with the first contact receiving surface 30 via the fixing part 33 and the convex portions 21, thereby positioning the driving unit 7 in the direction E that coincides with the shade position changing direction B-B. However, the driving unit 7 can be positioned in the direction E by causing the first contact surface 20 to be directly in contact with the first contact receiving surface 30.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle headlight capable of obtaining a plurality of light distribution patterns, the vehicle headlight comprising:

a light source that emits light;

a reflector that reflects the light emitted by the light source;

a projection lens that projects the light reflected by the reflector forward of a vehicle;

a shade that forms the light traveling to the projection lens from the reflector into a plurality of light beams that form the light distribution patterns;

a spring and a driving unit, configured to move the shade to a plurality of positions corresponding to the light beams, the driving unit including an attaching portion, and a first contact surface and a second contact surface that are substantially orthogonal to each other;

a frame that includes a receiving portion to which the attaching portion is attached, a first contact receiving surface for positioning the driving unit in a first positioning direction and a second contact receiving surface for positioning the driving unit in a second positioning direction, the first positioning direction intersecting with an attaching direction in which the driving unit is attached to the frame by being in contact with the first contact surface, and the second positioning direction intersecting with the attaching direction and is substantially orthogonal to the first positioning direction being in contact with the second contact surface; and an attaching member for attaching the attaching portion to the receiving portion, wherein the spring includes a fixing portion that is fixed in the first positioning direction while being sandwiched between the driving unit and the frame, and a positioning portion that is positioned in the second positioning direction by being in contact with the driving unit.

2. The vehicle headlight according to claim 1, wherein the positions of the shade include a first position that is diagonally upward and backward with respect to a vertical direction, and a second position that is diagonally downward and forward with respect to the vertical direction, the first positioning direction substantially coincides with a shade position changing direction between the first position and the second position, and the second positioning direction is substantially orthogonal to the shade position changing direction.

3. The vehicle headlight according to claim 1, wherein when the driving unit is fixed to the frame with the attaching member, the first contact surface is in contact with the first contact receiving surface, the second contact surface is in contact with the second contact receiving surface, and there is a clearance between the attaching portion and the receiving portion.

4. The vehicle headlight according to claim 1, wherein the spring and the shade are integrated.

* * * * *